United States Patent
Rapaport et al.

(10) Patent No.: US 6,794,068 B2
(45) Date of Patent: Sep. 21, 2004

(54) FUEL CELL STACK DESIGN AND METHOD OF OPERATION

(75) Inventors: Pinkhas A. Rapaport, Penfield, NY (US); Jeffrey A. Rock, Penfield, NY (US); Andrew D. Bosco, Rochester, NY (US); John P. Salvador, Penfield, NY (US); Hubert A. Gasteiger, Rochester, NY (US); Lesley A. Paine, Rochester, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/230,916

(22) Filed: Aug. 29, 2002

(65) Prior Publication Data

US 2004/0043279 A1 Mar. 4, 2004

(51) Int. Cl.⁷ ............................................. H01M 8/04
(52) U.S. Cl. ............................. 429/13; 429/38; 429/39
(58) Field of Search .............................. 429/13, 17, 34, 429/38, 39, 72

(56) References Cited

U.S. PATENT DOCUMENTS

| | | |
|---|---|---|
| 3,711,333 A | 1/1973 | Kohlmuller |
| 3,935,028 A | 1/1976 | Strasser et al. |
| 4,080,487 A | 3/1978 | Reiser |
| 4,722,873 A | 2/1988 | Matsumura |
| 5,272,017 A | 12/1993 | Swathirajan et al. |
| 5,316,871 A | 5/1994 | Swathirajan et al. |
| 5,413,878 A | 5/1995 | Williams et al. |
| 5,478,662 A | 12/1995 | Strasser |
| 5,518,828 A | 5/1996 | Senetar |
| 5,763,113 A | 6/1998 | Meltser et al. |
| 5,776,624 A | 7/1998 | Neutzler |
| 6,218,038 B1 | 4/2001 | Oko et al. |
| 2003/0022050 A1 * | 1/2003 | Barton et al. .................. 429/34 |
| 2003/0207165 A1 * | 11/2003 | Skala et al. .................... 429/39 |

* cited by examiner

Primary Examiner—Susy Tsang-Foster
(74) Attorney, Agent, or Firm—Cary W. Brooks, Esq.; Linda M. Deschere, Esq.

(57) ABSTRACT

A fuel cell stack has at least two segments of fuel cells each having reactant gas passages. Each of the cells in each segment is arranged such that the reactant gas passages of each cell are in parallel with each other cell. Flow of fuel cell fluids, normally in a gaseous state on the anode and cathode side of each cell, is in a gravity assisted downward direction. Gravity assisted flow directs water formed in each cell to lower removal points of the stack segments. Each pair of segments is separated by a separator segment having a separator channel, the separator segment forming an integral unit of the stack. Each separator channel redirects the entire flow of each fluid within the stack from the bottom of an upstream segment to the top of a next or downstream segment, without reacting the fluid, controlling relative humidity between stack segments.

22 Claims, 7 Drawing Sheets

FUEL CELL STACK DESIGN AND METHOD OF OPERATION

FIELD OF THE INVENTION

The present invention relates to fuel cell systems, and more particularly to a fuel cell stack and method to operate a fuel cell stack.

BACKGROUND OF THE INVENTION

Fuel cells have been used as a power source in many applications, for example, fuel cells have been proposed for use in electrical vehicular power plants to replace internal combustion engines. In proton exchange membrane (PEM) type fuel cells, hydrogen is supplied to the anode of the fuel cell, and oxygen is supplied as the oxidant to the cathode. A typical PEM fuel cell and its membrane electrode assembly (MEA) are described in U.S. Pat. Nos. 5,272,017 and 5,316,871, issued Dec. 21, 1993 and May 31, 1994 respectively, and commonly assigned to General Motors Corporation. MEAs include a thin, proton transmissive, non-electrically conductive solid polymer electrolyte membrane having the anode catalyst on one of its faces and a cathode catalyst on the opposite face.

The term "fuel cell" is typically used to refer to either a single cell or a plurality of cells (stack) depending on the context. A plurality of individual cells are commonly bundled together to form a fuel cell stack. Each cell within the stack comprises a membrane electrode assembly which provides its increment of voltage. Typical arrangements of multiple cells in a stack are described in U.S. Pat. No. 5,763,113 assigned to General Motors Corporation.

The electrically conductive elements sandwiching the MEAs may contain an array of channels or grooves in the faces thereof for distributing the fuel cells gaseous reactants over the surfaces of the respective cathode and anode. In the fuel cell stack, a plurality of cells are stacked together in electrical series while being separated one from the next by a gas impermeable, electrically conductive bipolar plate. In a common, single pass-through design, the reactants are supplied to the fuel cells through individual inlet manifolds and headers. From an inlet manifold providing flow to an inlet header, the reactant, for instance the anode flow, is divided in a number of flow paths feeding individual cells. All of the reactant (in this case the anode flow) as exhaust gas leaves the individual cells, mixes in the outlet header and exits the stack through the outlet manifold. In the single pass-through design, the anode sides of all cells have the same inlet hydrogen concentration.

The disadvantage of the single pass-through design of directing reactant gas is that the fuel cell stack is unable to stably operate at low stoichiometry; that is, near the mass flow of reactants needed to satisfy a given power output. It is therefore difficult to achieve efficient hydrogen or oxygen utilization. As a result, system efficiency is not optimized.

Stack designs which partially correct the above situation are known, such as the stack design of U.S. Pat. No. 5,478,662 issued to Strasser. In stacks such as the Strasser design, individual groups of parallel cells are arranged wherein the flow within each cell of each group is in parallel, and all the flow from each group flows between groups in series. In one exemplary stack design, each stack group has an inlet and an outlet manifold and each outlet manifold has drains to collect water which is formed as a reaction product. If not drained, the water builds up in succeeding cell groups. The number of individual fuel cells normally varies in these stack designs wherein the initial or upstream segments of cells contain the largest number of individual fuel cells and each successive segment provides a reduced quantity of fuel cells. With this type of configuration the last segment of the set of segments normally has the fewest number of individual fuel cells.

A disadvantage of common grouped stack designs results when reactant gases as reformate have inert components flowing through the stack. The inert gas portion of the reformate fuel which is retained through each group of the stack concentrates as the quantity of fuel cells in each segment decreases and can result in the final stack segment controlling the overall pressure drop through the stack. Normally, a hydrogen reformate stream entering a fuel cell stack comprises about 40% by volume of hydrogen. The remaining volume comprises nitrogen and other gases. Only the hydrogen is consumed (forming water) by the fuel cell stack, therefore 60% of the anode gas volume as inert gas flows through each group of the stack. This volume of inert gas determines the pressure drop across the smallest groups of the stack. When air is used as the cathode gas, oxygen concentration normally comprises between 20% to 40% by volume of the flow. The remaining volume of about 60% to 80% of the cathode flow comprises nitrogen with other inert gases.

The above series/parallel stack designs normally provide a serpentine type flow pattern throughout the stack. A serpentine flow path results in both anode and cathode side reactant flows which are either horizontal throughout the stack, or that must overcome gravity for one or more individual segments. Water build-up in the fuel cells inhibits reactant contact with the catalyst materials of the fuel cells, thus decreasing stack efficiency. Water generated in the non-gravity assisted groups must be forced through the cells with the reactant gas or permitted to "back flow" against the reactant flow direction for removal from the stack, reducing efficiency of the stack.

SUMMARY OF THE INVENTION

The above drawbacks for fuel cell stacks are overcome by a stack design of the present invention. The stack design of the present invention incorporates individual segments of fuel cell elements arranged in equivalent or different quantities of fuel cell elements within each segment. Each segment is arranged to provide flow within each fuel cell in a gravity assisted direction. This arrangement increases the stability of the fuel cell stack operation by allowing the entire volume of either the anode side or cathode side, or both flows, to be distributed through segments of the stack wherein only a portion of the total number of the cells are present.

In a preferred embodiment, a first segment normally having a greatest percentage of stack fuel cells depletes the greatest percentage of the reactant entering that segment. The first segment is arranged to provide downward or gravity assisted flow through each cell. The reactant exiting the first segment is directed to a second segment having a smaller quantity of fuel cells disposed therein, also arranged to provide a gravity assisted flow. This second segment reacts the majority of remaining fuel from the reactant flow. If necessary, a third or more segments of cells are employed to maximize utilization of the hydrogen and oxygen from the reactant flows. Each segment provides fuel cells in parallel and is arranged for gravity assisted flow through each cell of the segment. Overall stoichiometry of the stack is improved by the design of the present invention.

A separator segment is disposed between each stack segment wherein all of the flow exiting the preceding segment is routed through the separator segment. In a preferred embodiment, the separator segments are disposed between a pair of bipolar plates lacking a membrane electrode assembly (MEA). The purpose of the separator segment is to redirect all the flow from the outlet or lower portion of that segment into the inlet or upper portion of the next succeeding segment without any reaction in the fuel flow and therefore generating no additional water. Each separator segment is a structural member adjoining individual segments of fuel cell elements. A separate separator segment is provided between each two segments of fuel cells to separately redirect flow between individual flow groups, i.e., anode, cathode and coolant. The flow exiting each flow segment is collected at a lower section of that stack segment and redirected generally upwardly to a top inlet of the next succeeding segment to form a "cascaded" stack design. This provides flow through the individual fuel cell segments in only a gravity assisted direction, i.e., downward.

Water which forms as a reaction product in each individual segment is collectively drained at the base of each following separator segment. This water volume is discharged through drain lines to a discharge point in the stack. This ensures that the water formed in each segment of the stack drains in a gravity assisted direction toward the gravity drain points at the base of each separator segment and provides an efficient removal method for liquid water generated in the stack.

A further aspect of the present invention also provides selected use of modified flow stream geometry for fuel cell elements within each fuel cell segment. By modifying the flow path geometry, i.e., increasing flow passage size or length of fuel cell elements within at least one selected segment, different reformate streams of reactant having different volumetric percentages of inert gas(es) can be employed. The reformate fuel stream normally comprises a higher inert gas volume compared to the volume of the reactant gas i.e., hydrogen. As an example, a desirable reformate fuel stream initially comprises about 40% hydrogen by volume and about 60% inert gas by volume. As the stream traverses the stack and hydrogen is reacted to form water, the water drains off leaving an increasing volume of inert gas in the stream. It is therefore desirable to decrease the number of fuel cells in successive segments based on decreasing hydrogen volume. Decreasing fuel cell quantity while retaining fuel cell size can result in increased pressure drop in the downstream segment, thus controlling or limiting fuel stream flow through the stack. By increasing fuel cell cross-section in selected downstream segment(s), pressure drop does not increase as the number of cells decreases. By decreasing fuel cell length in select downstream segment(s), pressure drop does not increase as the number of cells decreases. The result is increased efficiency at reduced cost because fewer fuel cells are used while the net flow rate is retained. The inert gas which is not reacted by the fuel cell stack therefore does not control the overall pressure drop across the stack.

In a further aspect of the present invention, series flow of coolant through the individual segments is provided. The coolant enters the end of the stack where the reactants enter the stack and follows the fuel stream flow. The advantage of series flow is that coolant at its lowest temperature enters the stack at the point where the driest reactant gas enters the stack, providing the maximum reactant gas temperature drop and therefore the highest relative humidity for the inlet gas. Providing the lowest temperature for the entering reactant gas reduces its dew point and requires very little water vapor production to achieve the desired 100% relative humidity for fuel stream flow through the stack. It is normally desirable to provide about 100% relative humidity (RH) in each segment of the stack because water is continuously being generated and excess liquid water hinders flow and hydrogen contact with the fuel cells.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
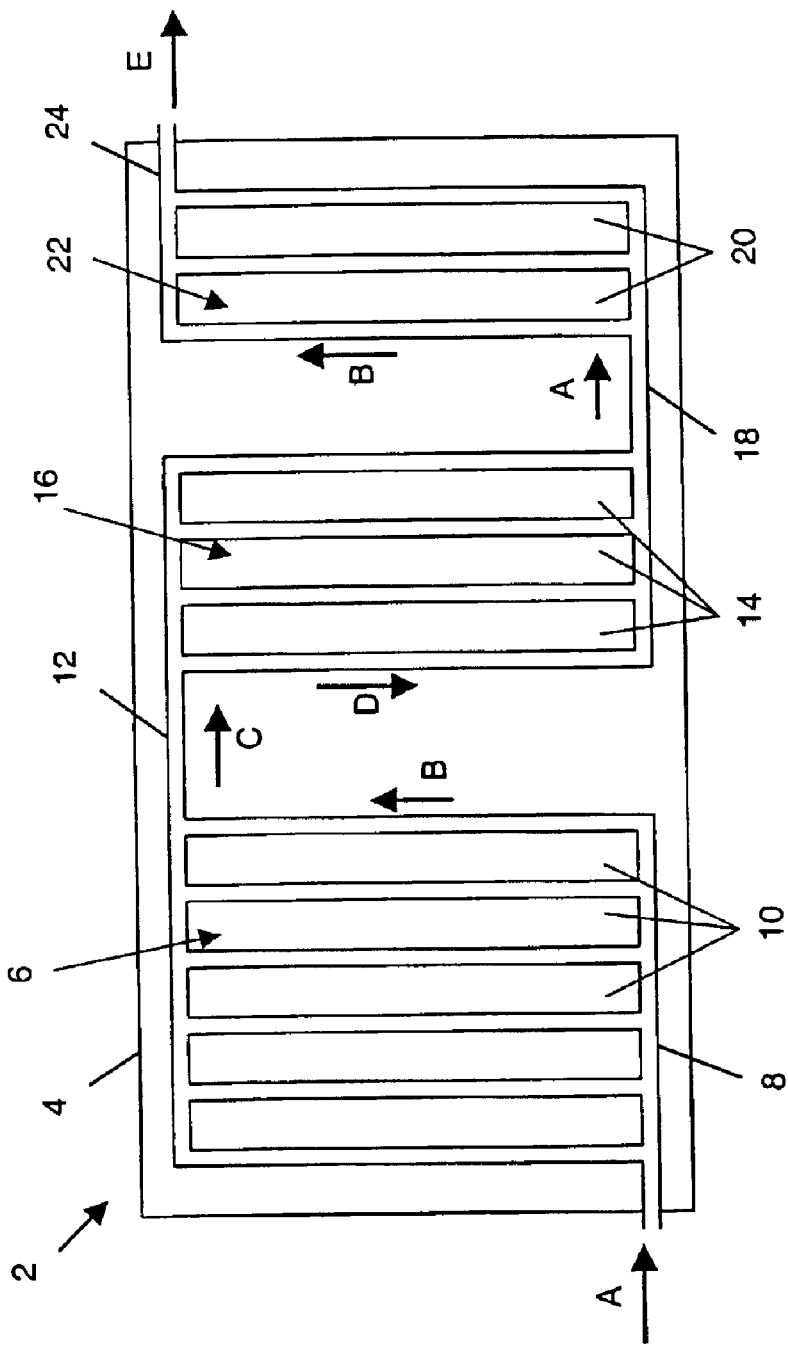
FIG. 1 is a perspective view of a single fuel stream through an exemplary three group fuel cell stack having a serpentine flow through the stack.

Referring to FIG. 1, a single reactant portion of a serpentine fuel cell stack 2 having a stack housing 4 is shown. A first cell group 6 comprises an inlet header 8 providing inlet flow to each of a plurality of parallel first fuel cells 10. Flow through each of the first fuel cells 10 discharges into a first combined header 12. The first combined header 12 further provides inlet flow to each of a plurality of parallel second fuel cells 14 of a second cell group 16. Flow through each of the second fuel cells 14 discharges into a second combined header 18. The second combined header 18 provides inlet flow to each of a plurality of parallel third fuel cells 20 of a third cell group 22. Flow through the third fuel cells 20 discharges to an exit header 24. The exit header 24 discharges this reactant flow from the stack housing 4 of the fuel cell stack 2.

Either an anode or cathode flow enters the fuel cell stack 2 in the lower flow direction A, as shown. From the inlet header 8, the inlet flow is divided amongst the plurality of the first fuel cells 10 wherein the flow in the first cell group 6 follows an upward flow direction B as shown. In the first combined header 12, all of the first cell group 6 flow is redirected in the flow direction C, as shown. Flow within the second fuel cells 14 of the second cell group 16 is in a downward flow direction D. In the second combined header 18, all of the second cell group 16 flow is redirected again in the lower flow direction A, as shown. The flow direction within the third fuel cells 20 of the third cell group 22 is similar to the flow direction in the first cell group 6, or in an upward flow direction B as shown. The third fuel cells 20 discharge into the exit header 24 and the combined flow in the exit header 24 exits the stack in the exit flow direction E as shown.

As shown in FIG. 1, flow in each adjacent cell group is in opposite directions. It is not possible to orient the fuel cell stack 2 such that each cell of each cell group flows in a gravity assisted direction, i.e., in the downward flow direction D. In the exemplary arrangement of FIG. 1, only flow in the second cell group 16 is downward, in a gravity assisted flow direction. The flow in each cell of both the first cell group 6 and the third cell group 22 is against gravity, and therefore water formed within these cells will either drain against the flow of the reactant gas or must be pushed through each cell by the reactant gas flow. This provides a less desirable arrangement for water management in the fuel cell stack 2 and therefore results in more difficult relative humidity control within the fuel stack 2.

Figure 2A:
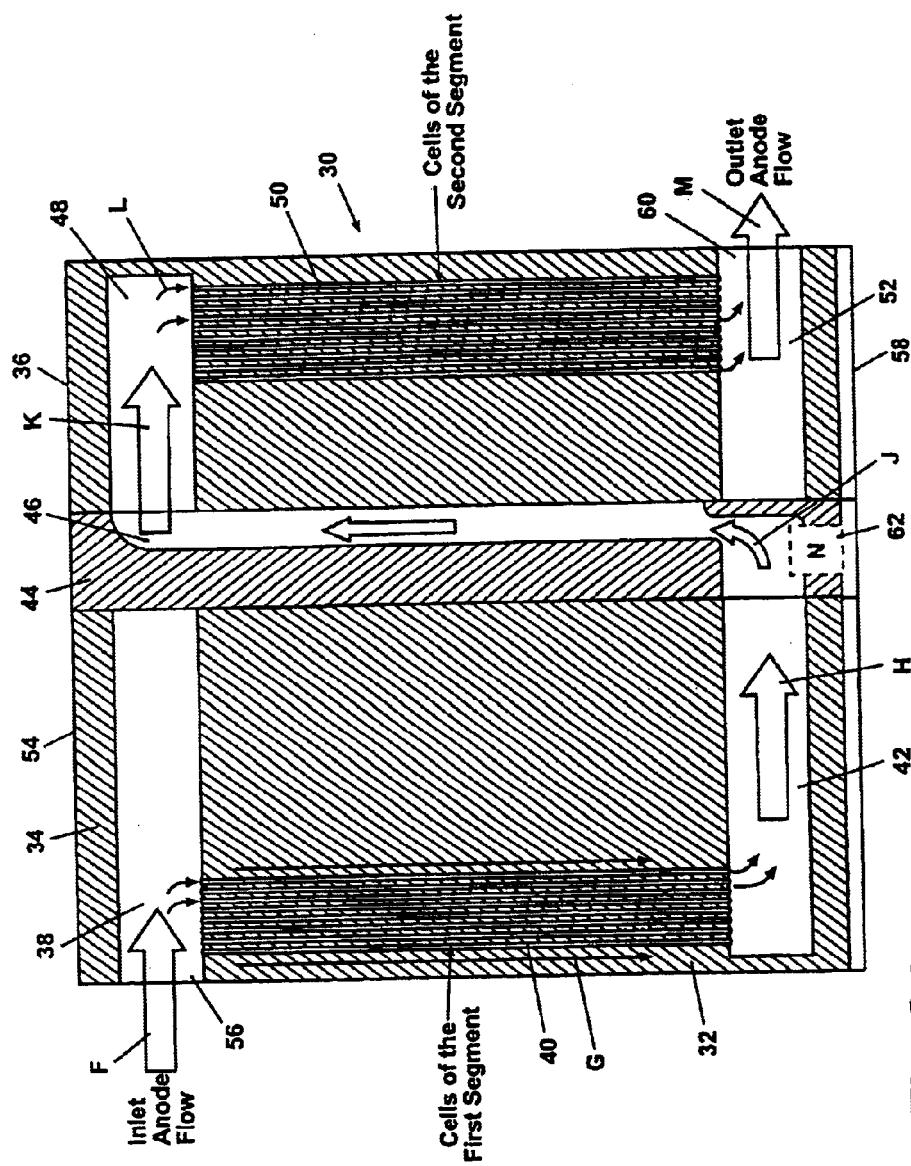
FIGS. 2A–2C are each a sectioned elevation view of a single flow stream through an exemplary two segment fuel cell stack according to principles of the present invention.
Figure 2B:
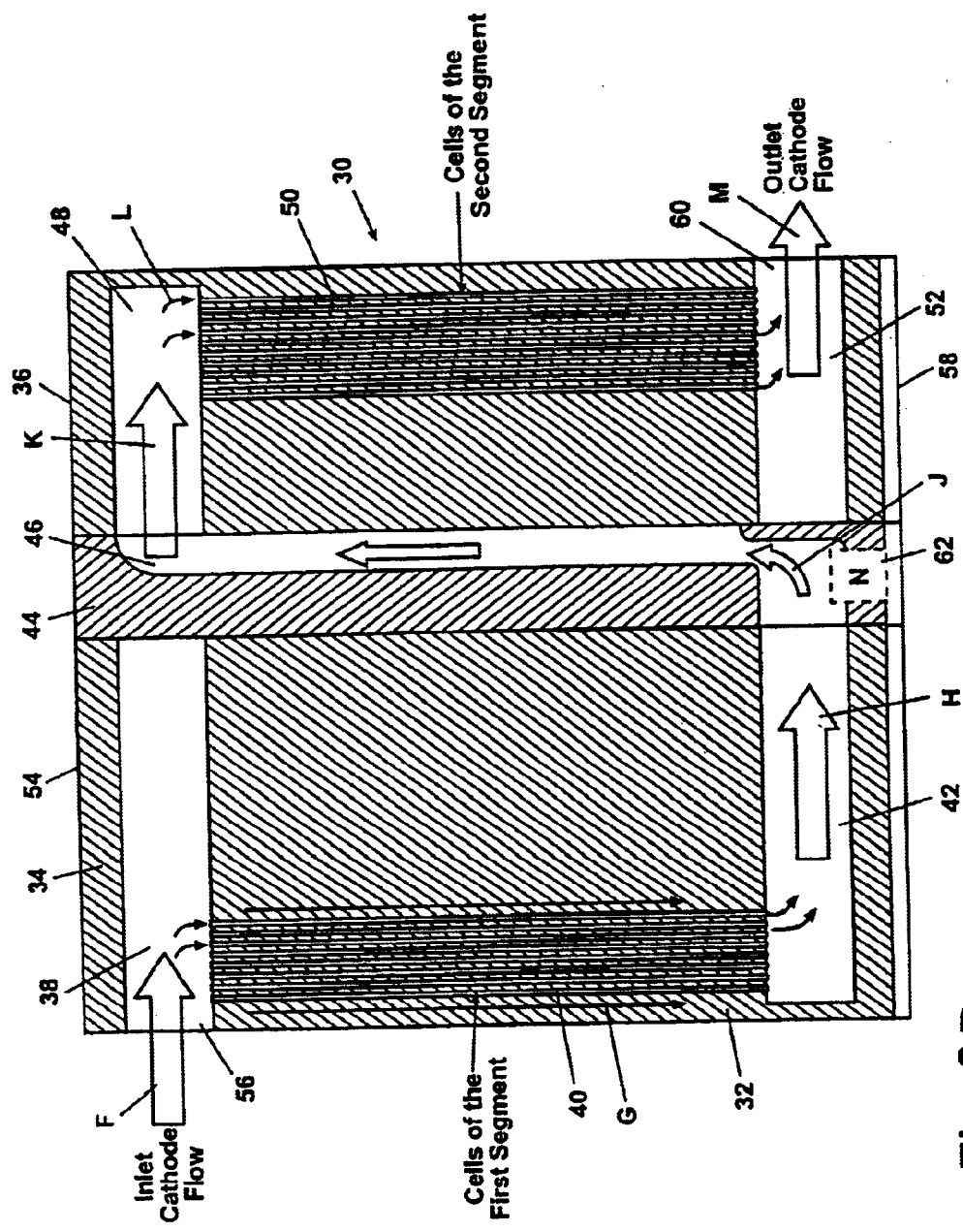
Figure 2C:
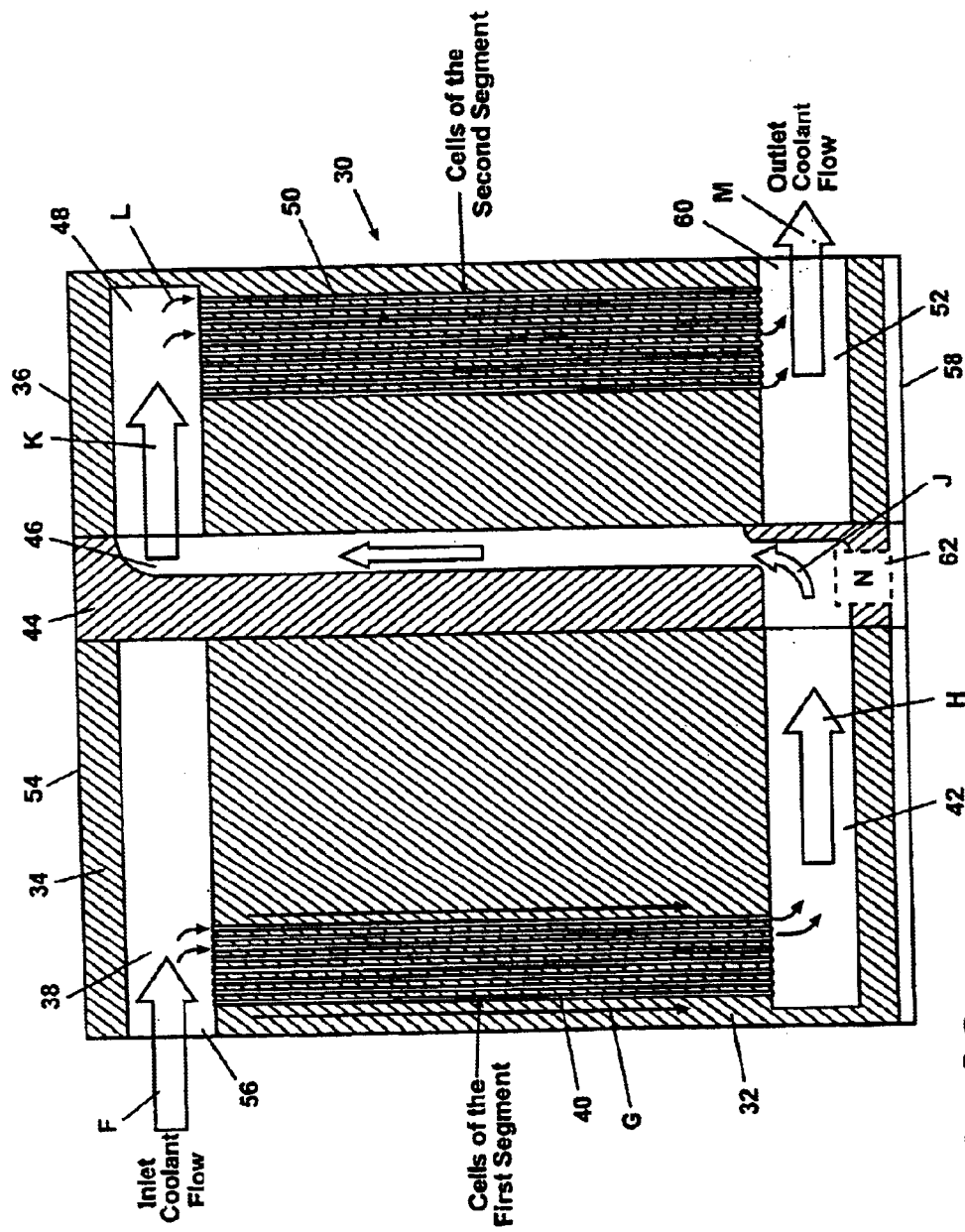

Referring now to FIG. 2, an exemplary fuel cell stack according to the principles of the present invention is shown. FIG. 2 provides a cascaded design fuel cell stack 30, having a cascaded stack body 32. The cascaded stack body 32 further comprises a first segment 34 and a second segment 36. An exemplary flow for an anode reactant is shown.

The first segment 34 further includes a first segment inlet header 38 in fluid communication with a plurality of first segment fuel cells 40. Each of the first segment fuel cells 40 are disposed in parallel to each other, each having reactant flow entering from the first segment inlet header 38 and discharging into a first segment exit header 42. The first segment exit header 42 is in fluid communication with a separator segment 44.

The separator segment 44 both mechanically and fluidly joins the first segment 34 to the second segment 36. A separator channel 46 provides fluid communication between the first segment exit header 42 and a second segment inlet header 48.

The second segment 36 further comprises the second segment inlet header 48 in fluid communication with a plurality of second segment fuel cells 50. Each of the second segment fuel cells 50 are disposed in parallel to each other, each having reactant flow entering from the second segment inlet header 48 and discharging into a second segment exit header 52. In this embodiment, the second segment exit header 52 collects and discharges all flow from the fuel cell stack 30.

The segments of the fuel cell stack 30 of the present invention are arranged in successive pairs of segments. The first segment 34 acts as the upstream segment wherein flow traverses the stack from the first segment 34 downstream to the second segment 36. If a third (or more) segment is used, the second segment 36 becomes the upstream segment relative to the third segment (not shown) and so forth.

An anode flow (shown) enters the cascaded fuel cell stack 30 in the first segment inlet flow direction F. A cathode flow (not shown) is similar to that shown in FIG. 2. From the first segment inlet header 38, the anode flow is redirected into the first segment fuel cells 40 in the first segment flow direction G as shown. All of the inlet flow to the stack traverses the first segment fuel cells 40. The discharge from the first segment fuel cells 40 enters the first segment exit header 42 in the first segment exit direction H.

All of the flow exiting the first segment 34 enters the separator channel 46 of the separator segment 44 and is redirected in the redirection flow direction J. From the separator channel 46 all of the flow is redirected into the second segment inlet header 48 of the second segment 36. From the second segment inlet header 48, the flow is redirected from the second segment inlet flow direction K to the second segment flow direction L. All of the flow in the second segment 36 flows within the second segment fuel cells 50. The discharge of the second segment fuel cells 50 is into the second segment exit header 52. The combined flow in the second segment exit header 52 exits the stack in a stack outlet direction M.

The cascaded fuel cell stack 30 provides an advantage in that all of the fuel cells are arranged to provide flow as "unidirectional" flow defined herein as a generally downward, gravity assisted flow direction shown as the first segment flow direction G and as the second segment flow direction L, respectively. By providing unidirectional flow through active fuel cells only in the gravity assisted direction, water generated by the reaction process is forced both by the flow velocity of the gas through the fuel cells and gravity into the individual segment exit headers 42 and 52, respectively. By disposing the separator segment 44 between the first segment 34 and the second segment 36 as shown, the separator segment 44 reaches an average operating temperature of the stack by conductive heat transfer from the adjacent stack segments as well as convective heat transfer from the stack reactants and the coolant flows.

In use, the fuel cell stack is configured to provide a stack upper portion 54 wherein a stack inlet orifice 56 is disposed adjacent thereto. Concurrently, the fuel cell stack of the present invention is configured to provide a stack lower portion 58 wherein a stack outlet orifice 60 is disposed. Anode or cathode flow enters through an orifice located in the stack upper portion and exits through the stack lower portion. Coolant flow is preferably similarly arranged to enter through the stack upper portion and exit through the stack lower portion.

By directing water which is generated by the reaction process of a fuel cell to the stack lower portion, the water is advantageously discharged. In the embodiment of FIG. 2 of the present invention, water is discharged from the fuel cell stack by a drain (not shown) which is connected to a separator drain area N of a lower separator segment 62. Each separator segment has a drain area similar to drain area N of the lower separator segment 62. The location of the water drain in the separator drain area N provides discharge of a predominate portion of the water generated by each stack segment. Relative humidity is controlled between segments at approximately 100% relative humidity by removing all or most of the liquid prior to entering the next segment.

Figure 3:
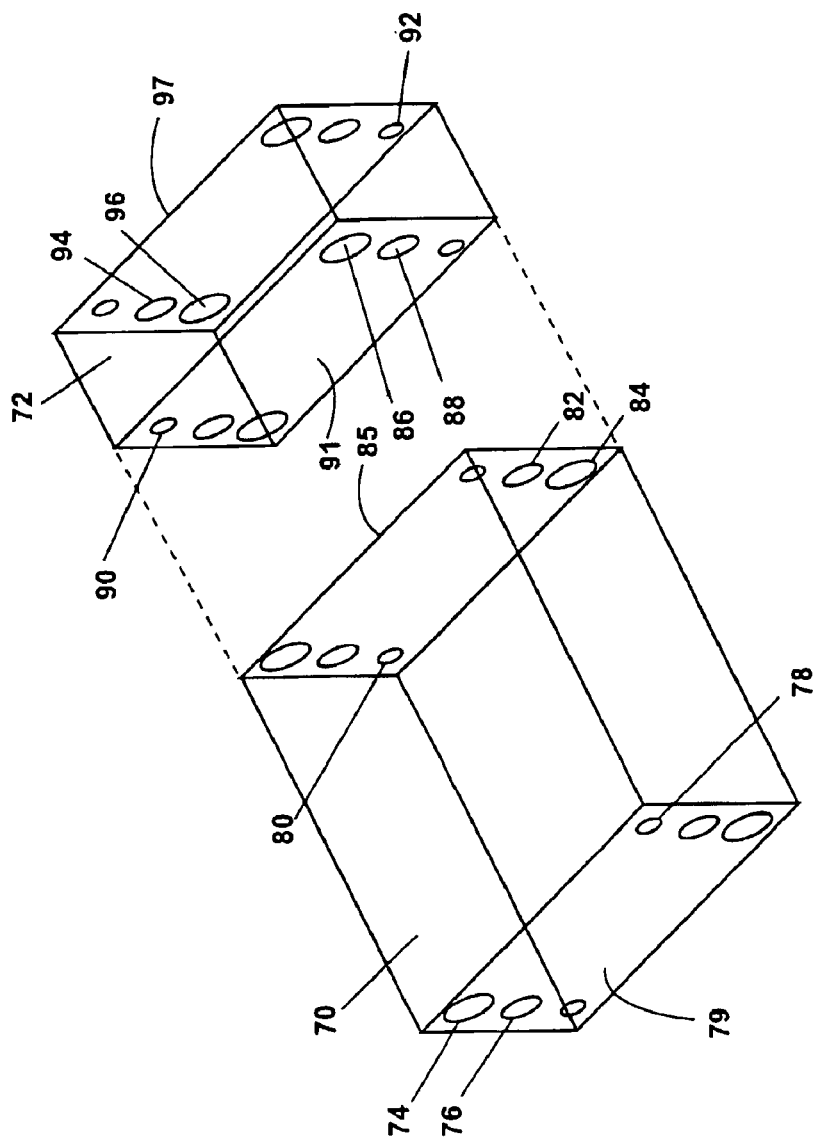
FIG. 3 is a block diagram perspective view providing a preferred embodiment of the present invention having a larger first segment of fuel cells and a smaller second segment of fuel cells, and wherein the separator segment is removed for clarity.

Referring now to FIG. 3, a simplified view showing two separated segments of a fuel cell stack of the present invention is provided. A preferred embodiment having a larger first segment 70 of fuel cells is shown adjacent to a second segment 72 having a smaller number of fuel cells. For simplicity, the separator segment is not shown in this view. The first segment 70 includes a cathode inlet 74, a coolant inlet 76, and an anode inlet 78, respectively, on an inlet face 79. Also shown on the first segment 70 are an anode outlet 80, a coolant outlet 82, and a cathode outlet 84, respectively, on an outlet face 85.

Similarly, the second segment 72 includes a cathode inlet 86, a coolant inlet 88, and an anode inlet 90, respectively, on an inlet face 91. The second segment 72 also includes an anode outlet 92, a coolant outlet 94, and a cathode outlet 96, respectively, on an outlet face 97. The legend identified on FIG. 3 provides in ascending size representative orifices for the anode, the coolant, and the cathode flow streams respectively.

Figure 4:
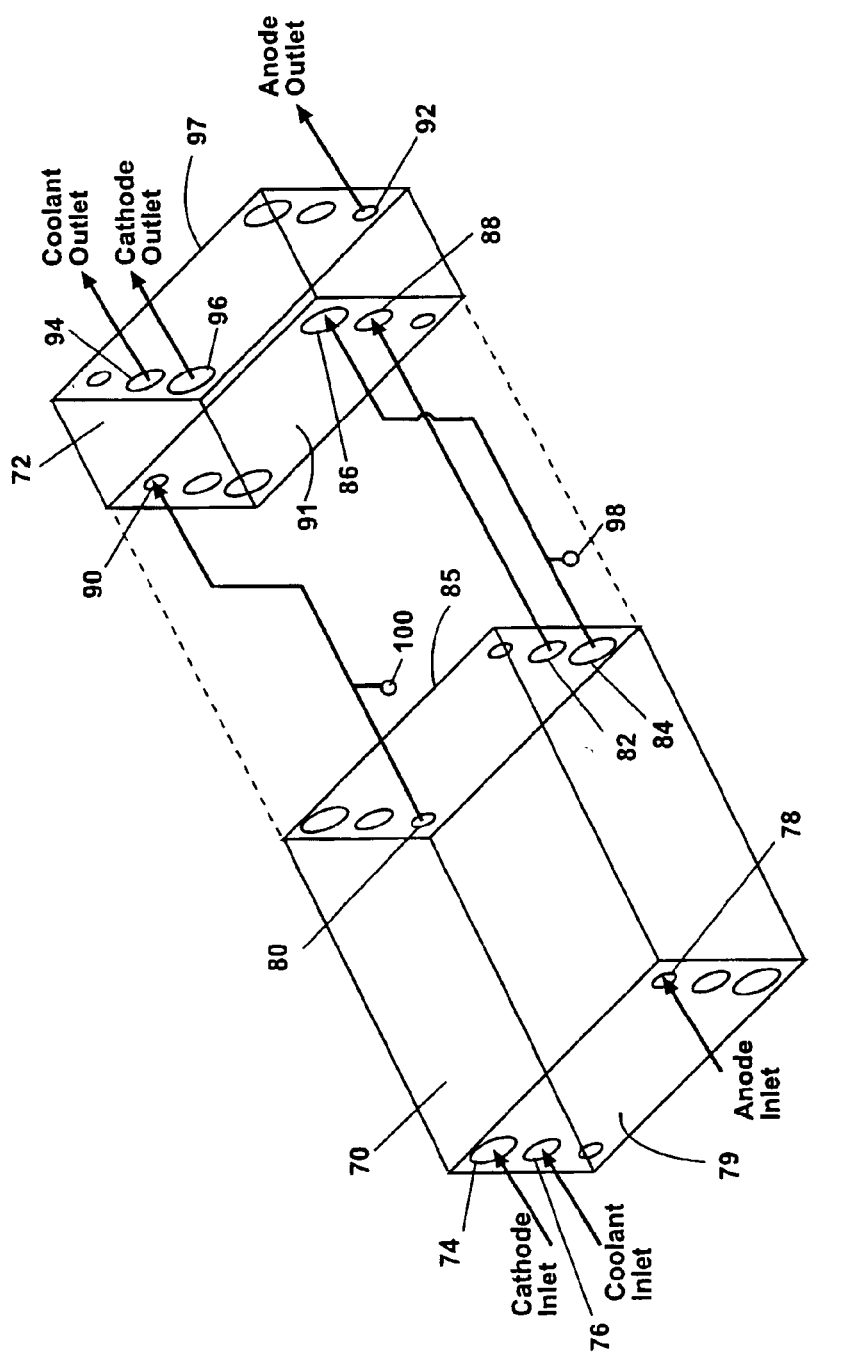
FIG. 4 is a perspective view based on FIG. 3 further showing the flow paths for a reformate fuel cell stack of the present invention.
Figure 5:
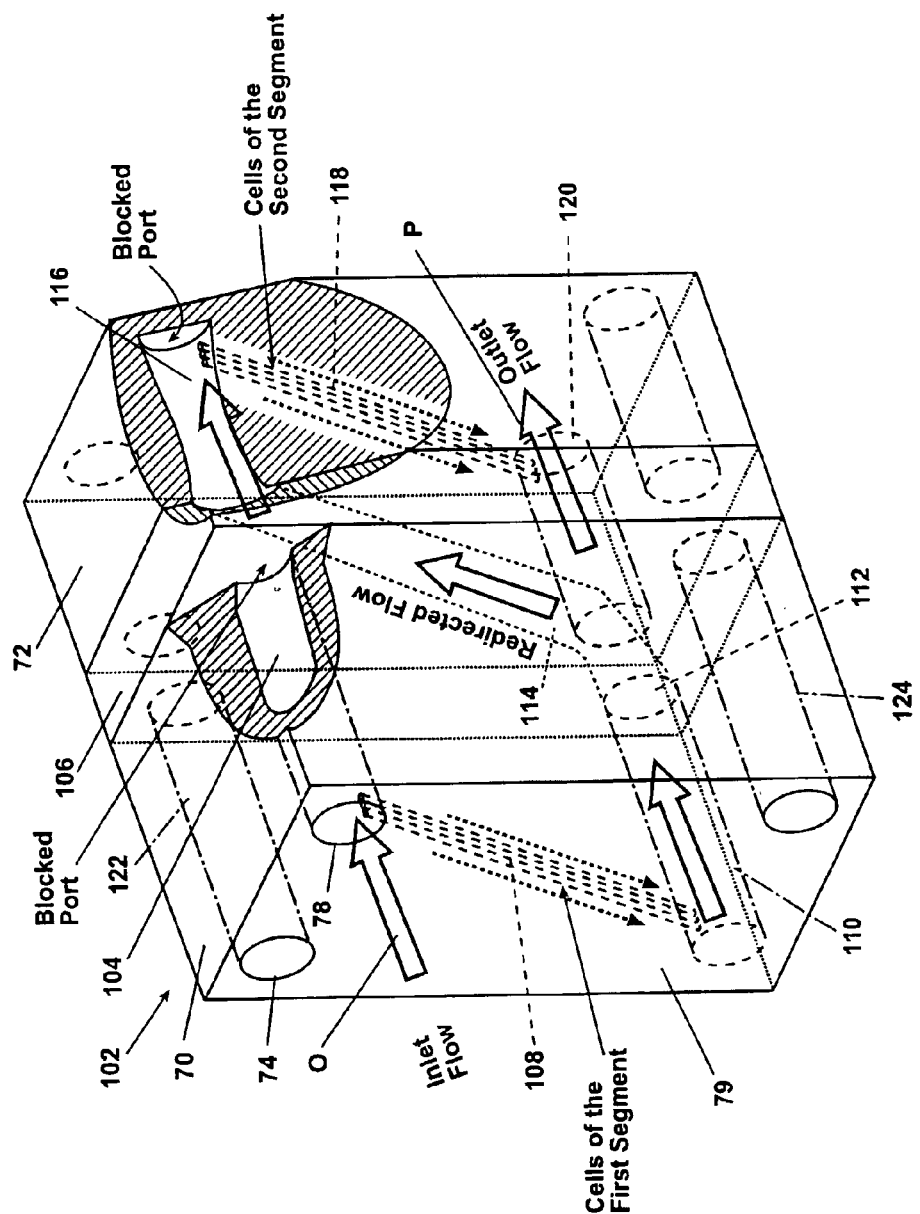
FIG. 5 is a partially sectioned perspective view of a single flow stream through an exemplary two segment fuel cell stack according to the principles of the present invention.

Referring now to FIGS. 4 and 5, the two segment fuel cell stack shown by FIG. 3 is further detailed. The preferred embodiment flow path for a reformate fuel is shown. For reformate fuel use, the preferred embodiment is to provide both the cathode and the anode flow inlets in an upper portion of each segment of the fuel cell stack. This provides for flow of anode and cathode reactants from a stack top to a stack bottom, i.e., the unidirectional flow downwards in each stack segment.

Referring to FIG. 4, the cathode flow enters the cathode inlet 74 and the anode flow enters the anode inlet 78 of the inlet face 79. Flow for the anode and cathode sides of the first segment 70 will be in the unilateral, or gravity assisted direction from an upper portion of the first segment 70 to a lower portion of the first segment 70. The cathode flow exits via the cathode outlet 84 and the anode flow exits via the anode outlet 80 on the outlet face 85.

Both the cathode and anode flows exiting the first segment 70 are directed by a separator channel (not shown) to the upper portion of the second segment 72 to enter the cathode inlet 86 and the anode inlet 90, respectively, on the inlet face 91 of the second segment 72. Both the anode and cathode flows traverse the second segment 72 from the upper portion of the segment to the lower portion of the segment. The anode flow exits the second segment 72 via the anode outlet 92, and the cathode flow exits the second segment 72 via the cathode outlet 96, both located on the outlet face 97. Coolant traverses both segments of the fuel cell stack of FIG. 4 via a path from the coolant inlet 76 on the inlet face 79 to the coolant outlet 82 on the outlet face 85 of the first segment 70, and subsequently is directed by a separator channel (not shown) to the coolant inlet 88 on the inlet face 91 and discharges through the coolant outlet 94 on the outlet face 97 of the second segment 72.

FIG. 4 shows the preferred flow paths for the reactants and coolant through an exemplary two segment fuel cell stack of the present invention. Air and a reformate gas are used as the fuel streams. Both anode and cathode gases normally contain inert gases as a significant (i.e., greater than 20% by volume) portion of their total volume. Both the anode and cathode fuel streams preferably flow through a segment having the largest quantity of fuel cells first, reacting hydrogen with oxygen to form water and create electrical current. The first segment 70 therefore consumes the greatest percentage of fuel. The first segment 70 will therefore produce the greatest voltage. The second segment 72 having a reduced quantity of fuel cells, further reacts both the anode and cathode fluids to extract the majority of the remaining hydrogen. The second segment 72 will therefore produce a lower voltage relative to the first segment 70. The overall average voltage from the first segment 70 and the second segment 72 will be greater than a fuel cell stack having parallel flow through a single set of fuel cells.

As further shown in FIG. 4, the cathode gas exits the first segment 70 through the cathode outlet 84 where entrained water is separated by a water separator 98 prior to cathode gas entrance into the second segment 72 at the cathode inlet 86. Anode gas exits the first segment 70 through the anode outlet 80. Between the first segment 70 and the second segment 72 entrained water in the anode stream will similarly be removed via a water separator 100. The water separator 98 and the water separator 100 are provided in individual separator segments (not shown) on the cathode outlet and the anode outlet respectively of the first segment 70.

Referring to FIG. 5, a perspective view of another embodiment of a fuel cell stack is shown. The fuel cell stack of FIG. 5 modifies the direction of reactant flow within a flow channel from that shown in FIG. 4, such that reactant flow within the flow channel of a separator segment is in a "cross flow" configuration as further defined below, rather than in a generally vertically upward flow configuration as shown in FIG. 4. An exemplary flow of anode gas enters at an upper portion of the first segment 70 generally indicated by a flow arrow O at the anode inlet 78. From the anode inlet 78, anode gas enters into a first segment inlet header 104. The distal end of the first segment inlet header 104 is blocked by a separator segment 106, forcing all flow within the first segment inlet header 104 into a plurality of first segment cells 108. All of the inlet flow downwardly traverses the first segment cells 108 and discharges into a first segment exit header 110. From the first segment exit header 110, the flow exits the first segment 70 at a segment exit orifice 112 and enters a separator flow channel 114 of the separator segment 106. The separator flow channel 114 redirects the flow upwards to a second segment inlet header 116 of the second segment 72. The distal end of the second segment inlet header 116 is blocked by either an additional separator segment 106 or a blocking member (not shown), forcing all flow within the second segment inlet header 116 into a plurality of second segment cells 118. All of the flow from the second segment inlet header 116 downwardly traverses the second segment cells 118 and discharges into a second segment exit header 120. Flow exits the second segment 72 from the second segment exit header 120 as shown by the flow arrow P.

As best shown in FIG. 5, for the exemplary first segment 70, the anode inlet 78 and a first segment inlet header 104 are preferably positioned on an opposite side of the inlet face 79 from the cathode inlet 74 and its cathode inlet header 122 (shown in phantom for clarity). Anode gas flow through the first segment cells 108 is diagonally downward as shown. Cathode gas flow (not shown) is also diagonally downward from the cathode inlet header 122 to a cathode exit header 124 such that cathode and anode flow are in a "cross flow" configuration with respect to each other. In another preferred embodiment (not shown), both the anode inlet 78 and the cathode inlet 74 are positioned on a same side of the inlet face 79. In this embodiment, both the anode flow and the cathode flow are in a "parallel flow" configuration with respect to each other, e.g., from the upper left to the lower right viewed from the inlet face 79. In both embodiments of anode/cathode flow, i.e., both "cross flow" and "parallel flow", both the anode flow and cathode flow are always in the unidirectional or generally downward flow direction within each fuel cell with respect to the first segment 70 and the second segment 72.

Coolant passages are preferably arranged in a parallel flow relationship with the cathode flow passages. With respect to the anode passages in each stack segment the coolant passages can therefore also be arranged in either of the parallel flow or the cross flow configurations described above. Coolant passages are also preferably arranged to follow the unidirectional flow direction, i.e., in a generally downward flow direction with respect to each segment of the stack. Coolant passages, however, do not require low point drain areas such as the separator drain area N of FIG. 2. Coolant passages can therefore be arranged in a plurality of configurations.

The quantity of fuel cells within each segment is adjustable and is predetermined by the reactant type. Each reactant flow passes through the cells of each segment in the unidirectional, or gravity assisted direction and the reactant is gradually depleted through each segment. For any given total inlet and outlet flow the stoichiometry of each segment of the multi-segment stack is higher than in a single pass-through stack where all cells are fed as one unit of cells. The overall stoichiometry of the cascaded fuel cell stack of the present invention is similar to a non-cascaded stack, however, the stoichiometry within each segment of the cascaded stack of the present invention is higher. Fuel cell designs commonly assume that about 10% to 11% of the hydrogen fuel is not consumed. Thus, if 110 units of hydrogen enter the stack, about 100 units will be reacted to generate electrical current, and about 10 units will exit the stack as unconsumed hydrogen. The stoichiometry is therefore 110/100=1.1.

If the cascaded stack is subdivided such that a 100 cell stack has a first segment of 67 cells and a second segment of 33 cells, both segments will have different, higher stoichiometries than the stack total. In an exemplary arrangement, given the same flow of hydrogen as above, a global stack stoichiometry of 1.1 will still exist. Within the first segment, 110 units of hydrogen enter, but only 67 units are consumed, therefore the first segment stoichiometry is 110/67=1.64. The remaining 43 hydrogen units enter the second segment wherein 33 units are consumed, resulting in a second segment stoichiometry of 43/33=1.30. The optimum design provides equal stoichiometry per segment which will occur at about a stoichiometry of 1.4 to 1.5. The number of cells in the exemplary first segment can be increased to produce a stoichiometry of between 1.4 to 1.5 in both segments.

Using a cascaded stack design, overall stack voltage is increased while retaining global stack stoichiometry. For instance, in the above example, the first segment having 67 cells will produce a higher voltage than the second segment both because the total reactant volume traverses the first segment and because the flow velocity in the first segment is higher due to the fewer number of cells. The increased flow velocity and improved water removal improve reaction of hydrogen and oxygen compared to a similar group of cells of a single pass-through stack design. The voltage of the second or later stack segments will be generally lower on average because the first stack segment has reacted the greatest volume of available hydrogen, however, with the present invention improvements each segment's efficiency is improved.

In a preferred embodiment for reformate fuel, the anode and cathode flows enter the stack at an upper portion of the first stack segment. Flow through each segment is unidirectional, i.e., in the gravity assisted generally downward direction for each of the fluids. Water generated in any of the anode or cathode elements collects and is discharged at the bottom of each separator channel as noted above. Since the separator channels are located between stack segments, channel temperature is automatically controlled by coolant temperature. The gas temperature in any of the separator channels will therefore adjust to the coolant temperature until water vapor within the separator channels reaches the channel/coolant dew point temperature and any excessive liquid water will drop out to the separator drain. An advantage of this "automatic" temperature control is that the reactant gas entering each segment is at about 100% RH.

Each of the anode and cathode gases reaching the inlet to successive segments is at approximately 100% relative humidity providing saturated flow to each segment. This eliminates the need to provide additional external temperature control for each segment. As the fuel is reacted in each individual segment, the average temperature of the flow rises from one segment to the next and the relative humidity is retained at about 100% RH because the liquid water is efficiently removed between segments by the gravity assisted flow paths of the segments and the use of separator channels.

The fuel cell stack of the present invention provides several advantages. Each segment of the fuel cell stack of the present invention provides gravity assisted flow, and a separator segment disposed between each segment efficiently removes water from the stack as well as controls humidity within the stack. By providing gravity assisted flow within each segment and providing individual segments of different quantities of fuel cell elements, the present invention permits a fuel cell stack to operate at varying stoichiometries between individual segments and provide a higher operating efficiency. The average voltage output of a fuel cell stack of the present invention will be increased over a fuel cell stack having total flow through only one segment of elements. The overall average stack voltage will also be higher than in a non-cascaded stack.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell stack comprising:
   a plurality of fuel cells separated into at least two fuel cell segments each having a portion of said plurality of fuel cells disposed therein and arranged as successive upstream and downstream pairs of segments;
   each of said portion of fuel cells of each segment having a plurality of reactant gas passages provided with a common inlet reactant gas passage and a common outlet reactant gas passage;
   each pair of segments having a separator segment disposed between said upstream segment and said downstream segment, said separator segment in fluid communication with said common outlet reactant gas passage of said upstream segment and said common inlet reactant gas passage of said downstream segment of the same segment pair; and
   each of the plurality of reactant gas passages of said at least two fuel cell segments being disposed in a unidirectional gravity assisted flow direction.

2. The fuel cell stack of claim 1 further comprising:
   each pair of said at least two fuel cell segments being arranged as adjacent segments separated by said separator segment, said separator segment forming a contiguous structural connection between each pair of said at least two fuel cell segments; and
   each separator channel having a generally upward oriented flow passage providing fluid communication between said common outlet reactant gas passage of said upstream segment and said common inlet reactant gas passage of said downstream segment.

3. The fuel cell stack of claim 2, wherein said plurality of reactant gas passages comprises a group of anode passages and a group of cathode passages.

4. The fuel cell stack of claim 3, further comprising:
   said group of anode passages being in fluid communication with a stack anode inlet port through a preselected one of said common inlet reactant gas passages; and
   said group of anode passages being in fluid communication with a stack anode outlet port through a preselected one of said common outlet reactant gas passages.

5. The fuel cell stack of claim 4, further comprising:
said group of cathode passages being in fluid communication with a stack cathode inlet port through a preselected one of said common inlet reactant gas passages; and
said group of cathode passages being in fluid communication with a stack cathode outlet port through a preselected one of said common outlet reactant gas passages.

6. The fuel cell stack of claim 5, wherein each passage of said group of cathode passages is disposed in a cross flow relationship with a counterpart passage of said group of anode passages.

7. The fuel cell stack of claim 5 wherein each passage of said group of cathode passages is disposed in a parallel flow relationship with a counterpart passage of said group of anode passages.

8. The fuel cell stack of claim 3 further comprising a group of coolant passages being in fluid communication with a stack coolant inlet port through a common inlet coolant passage, said group of coolant passages being in fluid communication with a stack coolant outlet port.

9. The fuel cell stack of claim 8, wherein each passage of said group of coolant passages is disposed adjacent to and in a parallel flow relationship with a counterpart passage of at least one of said group of anode passages and said group of cathode passages.

10. The fuel cell stack of claim 1 wherein a quantity of fuel cells within each segment varies between each of said at least two fuel cell segments.

11. The fuel cell stack of claim 1 wherein a quantity of fuel cells within each segment decreases between each segment from an inlet portion of the stack to an outlet portion of the stack.

12. A fuel cell stack comprising:
a plurality of fuel cell assemblies each including an anode catalyst on a first face and a cathode catalyst on a second face;
a plurality of anode gas passages, each said passage disposed adjacent to a respective one of said first face of said plurality of fuel cell assemblies;
a plurality of cathode gas passages, each said passage disposed adjacent to a respective one of said second face of a respective one of said plurality of fuel cell assemblies;
said plurality of fuel cell assemblies being arranged in at least two pairs of adjacent segments of cells wherein said plurality of anode gas passages and cathode gas passages of said plurality of fuel cell assemblies are provided in a unidirectional gravity assisted flow direction within each said adjacent segment of said stack; and
each of said at least two adjacent segments having at least one separator segment disposed there between defining a generally upward flow passage for connecting the plurality of said anode gas passages and said cathode gas passages of said adjacent segments.

13. The fuel cell stack of claim 12 further comprising:
an anode gas separator channel disposed between each said pair of adjacent segments in fluid communication with the anode gas passages within each said pair of adjacent segments; and
a cathode gas separator channel disposed between each said pair of adjacent segments in fluid communication with the cathode gas passages within each said pair of adjacent segments.

14. The fuel cell stack of claim 13 wherein a coolant passage is disposed between each of said first and second faces of any two consecutive fuel cells of said plurality of fuel cell assemblies.

15. The fuel cell stack of claim 14 wherein a coolant separator channel is disposed between each said pair of adjacent segments in fluid communication with the coolant passages of the fuel cell assemblies within each said pair of adjacent segments.

16. The fuel cell stack of claim 12 wherein water formed in each said segment of cells is discharged to at least one stack drain.

17. A fuel cell stack comprising:
a plurality of fuel cell assemblies each including an anode catalyst on a first face and a cathode catalyst on a second face;
a plurality of anode gas passages, each said passage disposed next to said first face of a respective one of said plurality of fuel cell assemblies;
a plurality of cathode gas passages, each said passage disposed adjacent to said second face of a respective one of said plurality of fuel cell assemblies;
said plurality of fuel cell assemblies being arranged in at least two adjacent segments of cells wherein at least one each of said anode gas passages and said cathode gas passages are provided in series between said segments and the at least one of said anode gas passages and said cathode gas passages are disposed in a unidirectional gravity assisted flow direction within each segment of said stack; and
each of said anode and cathode gas passages within at least one pre-selected segment having a geometry varied to control a pressure drop of said anode and cathode gas passages.

18. The fuel cell stack of claim 17 wherein a number of fuel cell assemblies within each segment decreases between segment pairs from an inlet portion of the stack to an outlet portion of the stack.

19. The fuel cell stack of claim 18, further comprising:
each said segment pair being one of an upstream segment and a downstream segment;
each said segment of each said segment pair having a pressure drop; and
said pressure drop of said downstream segment being one of equal to and less than said pressure drop of said upstream segment for each segment pair from the inlet portion of the stack to the outlet portion of the stack.

20. The fuel cell stack of claim 19, wherein said pressure drop of said downstream segment of at least one segment pair is decreased by providing at least one of an increased fuel cell assembly width for each fuel cell assembly of said downstream segment, and a decreased assembly length for each fuel cell assembly of said downstream segment.

21. A method to operate a fuel cell stack having a plurality of fuel cells each having a plurality of reactant gas passages extending therebetween, and a cascaded stack design providing individual segments of differing numbers of fuel cells, said method comprising the steps of:
arranging said segments to form adjacent pairs of segments each including a plurality of fuel cells with a varying quantity of fuel cells in each segment to vary a stoichiometry of each segment;
orienting all of the reactant gas passages of said plurality of fuel cells in a unidirectional gravity assisted flow direction within each said segment of said stack;

disposing at least one separator channel between each said segment pair; and connecting the plurality of reactant gas passages between each said segment pair by said at least one separator channel wherein said reactant gas passages in each said segment are connected in parallel and said reactant gas passages of each said segment are connected in series to an adjacent segment.

22. The method of claim 21 further comprising the further steps of:

collecting a water volume from both the plurality of fuel cells and each separator channel; and discharging the water volume to at least one stack drain.

* * * * *